United States Patent [19]
Paik et al.

[11] Patent Number: 6,122,643
[45] Date of Patent: Sep. 19, 2000

[54] METHOD AND SYSTEM FOR ELECTRONIC ARTICLE SUBMISSION

[75] Inventors: Young Paik; Timothy J. Malcolm, both of San Jose; Kartik Ramakrishnan, Stanford; Catherine Star-Young, Menlo Park, all of Calif.

[73] Assignee: Synopsys, Inc., Mountain View, Calif.

[21] Appl. No.: 08/917,799

[22] Filed: Aug. 25, 1997

[51] Int. Cl.$^7$ ................................................. G06F 17/00
[52] U.S. Cl. .............................. 707/104; 707/100; 707/10
[58] Field of Search ........................... 395/200.3, 200.48, 395/200.49, 200.32, 187.01, 127, 200.52; 707/3, 100, 501, 530, 104, 10, 526

[56] References Cited

U.S. PATENT DOCUMENTS

| | | | |
|---|---|---|---|
| Re. 36,422 | 11/1999 | Pazel | 707/104 |
| 5,226,117 | 7/1993 | Miklos | 345/356 |
| 5,754,766 | 5/1998 | Shaw et al. | 395/200.3 |
| 5,778,372 | 7/1998 | Cordell et al. | 707/100 |
| 5,802,299 | 9/1998 | Logan et al. | 395/200.48 |
| 5,838,916 | 11/1998 | Domenikos et al. | 395/200.49 |
| 5,852,714 | 12/1998 | Tseng et al. | 395/187.01 |
| 5,870,769 | 2/1999 | Freund | 707/501 |
| 5,890,149 | 3/1999 | Schomonsees | 707/3 |
| 5,903,905 | 5/1999 | Andersen et al. | 707/526 |
| 5,905,862 | 5/1999 | Hoekstra | 395/200.32 |

*Primary Examiner*—Wayne Amsbury
*Assistant Examiner*—Thuy Pardo
*Attorney, Agent, or Firm*—Wagner Murabito & Hao LLP

[57] ABSTRACT

A system and method for automated submission of an article into an electronic document system. In one embodiment, the present invention receives, in response to a web-based query form, the location of an electronic copy of an article which is desired to be submitted into an electronic document system. In the present embodiment, the article is accessible to the electronic document system. After retrieving the article, the present invention forwards the retrieved article to a universal resource locator corresponding to an article review site. At the article review site, the article is organized into a split-page format. That is, the article is organized such that electronic document system-based program code representing the displayed appearance of the article is shown on one side of the display. The article itself is displayed on the other side of the display such that the result of alterations to the electronic document system-based program code on the display appearance of the article is readily observable. The present embodiment also prompts review of the article, if necessary. After the article is reviewed, the article is entered into the electronic document system. In so doing, the present invention provides a method and system which efficiently allows for the submission of articles into an Internet or Intranet system; a method and system which efficiently reviews an article for content and which reviews the article's grammar and other stylistic characteristics; and a system and method which allows a user to readily place an article in a format suitable for display in an Internet or Intranet system.

27 Claims, 23 Drawing Sheets

```
        $outdir{'authordir'} = "$this->{queue_dir}/$author";
if ($article->{review_stage} eq 'rjt-upd-dkd' ||
    $article->{review_stage} eq 'rjt-upd-rev') {
   $t_origin = 'ex' if ($origin eq 'External');
       $t_origin = 'in' if ($origin eq 'Internal');
      use Sybase_env;
      use Sybase::DBlib;

my $syb_user=Sybase_env->get_user;
   my $syb_passwd=Sybase_env->get_password;
   my $syb_server=Sybase_env-get->server;

$dbh = Sybase::DBlib->dblogin($syb_user,$syb_passwd,$syb_server);
    $dbh->dbcmd("select upd_emp_id=emp.employee_id
                     from info_mgr..employees emp,
                     solvit..solvit_metadata meta
                     where emp.login_name=meta.updated_by
                     and meta.doc_id=\"$outfile\"
                     and meta.origin=\"$t_origin\"");
    $dbh->dbsqlexec;

$dbh->dbresults;
        while(%data=$dbh->dbnextrow(1))
        {
                $outdir{'upd_emp_id'} = "$this-
>{queue_dir}/$data{'upd_emp_id'}";
                }

}

$rmdir{'userdir'} = "$this->{queue_dir}/$temp_user" if ($control-
>{next_action} eq 'Reject Article');

if ($control->{next_action} eq 'Reject Article')
      {
         $rmdir{'userdir'}="$this->{queue_dir}/$user";
} if($article->{retrieve_update} eq 'production') {
          $outdir{'userdir'} = "$this->{queue_dir}/$user";
          }

$outdir{'reviewdir'} = "$this->{queue_dir}/$reviewer"
              unless ($article->{review_stage} eq 'sub' ||
                     $article->{review_stage} eq '' || $article->{review_stage}
  eq 'upd-sub');
```

FIG. 5A

```
$rmdir{'reviewerdir'} = "$this->{queue_dir}/$reviewer"
    if ($control->{next_action} eq 'Reject Article' ||
                ($article->{review_stage} eq 'sub' &&
                $article_>{author} ne $article->{reviewer}) ||
                ($article_>{review_stage} eq 'upd-sub'&&
                $user ne $article->{reviewer}));

$rmdir{'rm_author_dir'} = "$this->{queue_dir}/$old_author" if ($article-
>{old_author} &&
                                                ($article->{author} ne
$article->{old_author}) );

$rmdir{'rm_reviewer_dir'} = "$this->{queue_dir}/$old_reviewer" if ($article-
>{old_reviewer} &&
```

FIG. 5A (CONT.)

```
                $article->{old_reviewer} &&                    ($article->{reviewer} ne $article_>{old_reviewer}) );                           $article->{author} ne } else {

&outdir{'userdir'} = "$this->{queue_dir}/$user";

} if ($origin eq 'External') {

$origin = 'ex';
                    $fulloutfile = "$this->{queue_dir}/$user/$outfile";

} elsif ($origin eq 'Internal') {

$origin = 'in';
                    $fulloutfile = "$this->{queue-dir}/$user/$outfile";

} else {

$origin = 'in';
                    $fulloutfile = "$this->{queue_dir}/$user/$outfile";

}

$action = $article->get ('review_stage');

$command = '';
        if ( $db_action eq 'insert' && !$error_string) {

$command = "insert-solvit_metadata \@status = \"$action\",";
                    $command .="\@origin = \"$origin\",";
                    $command.="\@doc_id = \"$article->{filename}\", \@doc_path=
\"$fulloutfile\", ";
                    $command .="\@doc_size = $doc_size, \@doc_source = \"$article-
>{source}\", ";
                    $command .= "\@doc_title = \"$article->{title}\", \@doc_format =
\"$article->{format}\", ";
                    $command .= "\@version_from = \"$article->{version from}\",
\@version_to = \"$article->{version to}\", ";
```

FIG. 5B

```
$command .= "\@access_level = NULL, \@product_code= \"NULL\", ";
$command .= "\@written_emp_id = $user,";
$command .= "\@reviewer_id= $reviewer";

} elsif ($db_action eq 'update') {

$error_string = '' if ($error_string);

$command = "update_ solvit _metadata \@satus = \"$action\", ";
$command .= "\@origin = \"$origin\", ";
$command .= "\@doc_id = \"$article->{filename}\", \@doc_path = \"$fulloutfile\", ";
$command .= "\@doc_size = $doc_size, \@doc_source = \"$article->{source}\", ";
$command .= "\@doc_title = \"$article->{title}\", \@doc_format = \"$article->{format}\", ";
$command .= "\@version_from = \"$article->{version_from}\", \@version_to = \"$article->{version_to}\", ";
```

FIG. 5B (CONT.)

```
        $command .= "\@access_level = NULL, \@product_code = \"NULL\", ";
        $command .= "\@status_creator_id = $user,";
        $command .= "\@reviewer_id= $reviewer,";
        $command .= "\@what= $what";
}

$SQLcommand = '';
$retval = '';
if(!$command) { }
else {
        if(!$error_string)
        { use Sybase_env;
          use Sybase::DBlib;

my $syb_user=Sybase_env->get_user;
          my $syb_passwd=Sybase_env->get_password;
          my $syb_server=Sybase_env->get_server;

$dbh = Sybase::DBlib->dblogin($syb_user,$syb_passwd,$syb_server);
           $dbh->dbcmd("$command");
           $dbh_>dbsqlexec;
           $dbh->dbresults;
           $retval=$dbh->dbretstatus;

}
} unless ($retval == 0) {
        $error_string .= "<H2>There has been a problem:</H2>\n";
        $error_string .= "Your Article \'<I>$outfile</I>\' ";
        $error_string .= "could not be saved-- ";
        $error_string .= "Ensure that all the ";
        $error_string .= "fields are filled in correctly and that the Article ";
        $error_string .= "filename is unique!<BR>\n";

}

`rm $SQL select` unless (!$SQLselect);

if (!$error_string) { foreach (keys(%outdir)) {
```

FIG. 5C

```
        $error_string .= $this->write_to_queue_dir ($article, $control,
$outdir{$_}, $outfile);

} foreach (keys(%rmdir)) {

$error_string .= $this->remove_from_queue_dir ($article, $control,
$rmdir{$_}, $outfile);

}
    }
    if ($error_string) { return ($error_string);
```

FIG. 5C (CONT.)

```
       } else { return ('');

}

} sub check_unique_filename { my $this=shift;
my $article = shift;
my $control = shift;
my $error_string = '';
my $SQLcommand = '';
my $retval = '';
my $outfile = $article->get ('filename');
my $origin = $article->get ('in_or_ex');
my $author = $article->get('author');
my $user = $article->get('user');

$author = $this->get_employee_id ($author)      if ($author);
       $user = $this->get_emloyee_id ($user)           if ($user);

if ($author eq 'error:' | | $user eq 'error:') {

$error_string .= "There has been an cryptic error in the realm of
username<->id mapping.<BR>";

} if ($origin eq 'External') {
         $origin = 'ex';
   } elsif ($origin eq 'Internal') {
         $origin = 'in';
   } else {
         $origin = 'in';
   }

$SQLcommand = '';
   $retval = '';
```

FIG. 5D

```
            $SQLselect = $this->write_temp_file ("select doc_id from solvit_metadata
where
doc_id = \'$outfile\'")
              unless ($error_string);

# $SQLselect = $this->write_temp_file ("select doc_id from solvit_metadata
   #                                                    where origin = \'$origin \' AND
doc_id = \'$outfile\'")
       #                                                            unless ($error_string);

if($SQLselect) {
      $retval = $this->sybase_command("$SQLselect") unless ($error_string);
   } if ($retval && !$error_string) {
```

FIG. 5D (CONT.)

```
    $key = 'ERROR::' if (!$error_string);
    $error_string .= "<H2>There has been a problem:</H2>\n";
    $error_string .= "File names must be unique within the system. It
appears ";
    $error_string .= "as though \'<I>$outfile</I>\' already exists.  Please try ";
    $error_string .= "saving the Article with a different name.<BR>\n";

} if ($error_string) { return ($error_string);

} else { return ('');

}

} sub write_to_queue_dir {
my $this = shift;
my $article = shift;
my $control = shift;
my $outdir = shift;
my $outfile = shift;
my $content = $article->get_encoded_article ();

mkdir("$outdir", 0777) unless (-d $outdir);
    chmod 0777, $outdir;
    if (!-d $outdir) {

$error_string .= "<H2>There has been a problem:</H2>\n";
        $error_string .= "Your Article holding directory \'<I>$outdir</I>\' ";
        $error_string .= "could not be created.<BR>\n";
  } if (open(OUTFILE,">$outdir/$outfile")) { if ($content && print OUTFILE "$content") { close (OUTFILE);
        chmod 0666,"$outdir/$outfile";
```

FIG. 5E

```
    } else {

$error_string .= "<H2>There has been a problem:</H2>\n";
        $error_string .= "Your Article \'<I>$outfile</I>\' ";
        $error_string .= "could not be saved to the file location ";
        $error_string .- "\'<I>$outdir</I>.\'<BR>\n";

close (OUTFILE);

}

} else {

$error_string .= "<H2>There has been a problem:</H2>\n";
    $error_string .= "Your Article \'<I>$outfile</I>\' ";
    $error_string .= "could not be saved to the file location ";
```

FIG. 5E (CONT.)

```
            $error_string .= "\'<I>$outdir</I>. \'<BR>\n";

close (OUTFILE);

} if ($error_string) { return ($error_string);

} else { return ('');

}

} sub remove_from_queue_dir {
    my $this = shift;
    my $article = shift;
    my $control = shift;
    my $rmdir = shift;
    my $rmfile = shift;

`rm -f $rmdir/$rmfile`;

if ($error_string) { return ($error_string);

} else { return ('');

}

} sub remove_from_production {
        my $this = shift;
        my $article = shift;
        my $control = shift;
        my $action = '';
        my $line1 = '';
```

FIG. 5F

```
my $line2 = '';
my $SQLcommand = '';
my $error_string = '';
my $retval = '';
my $origin = '';
my $destination = '';

my $prod_path = $this->get ('prod_root');
my $source = $article->get ('source');
my $filename = $article->get ('filename');
my $user = $article->get ('user');
my $doc_size = $article->get_size ('content');
my $today = $this->date ();

if (($article->get ('in_or_ex')) eq 'External') {
```

FIG. 5F (CONT.)

```
        $destination = 'external';
        $origin = 'ex';

} else {

$destination = 'internal';
        $origin = 'in';

} my $fullrmfile = "$prod_path/$destination/$source/$filename";
    if (-e $fullrmfile) {

$action = 'del';

$command = "update_solvit_metadata \@status = \"action\", \@origin = \"$origin\", ";
        $command .= "\@doc_id = \"$article->{filename}\", \@doc_path = \"NULL\", ";
        $command .= "\@doc_size = NULL, \@doc_source = \"NULL\", ";
        $command .= "\@doc_title = \"NULL\", \@doc_format = \"NULL\", ";
        $command .= "\@version_from = \"NULL\", \@version_to = \"NULL\", ";
        $command .= "\@access_level = NULL, \@product_code = \"NULL\", ";
        $command .= "\@satus_creator_id = $user, \@reviewer_id= $reviewer, \@what=0";

}
    $SQLcommand = '';
    $retval = '';

SQLselect = $this->write_temp_file ($command);

if($SQLselect) {
         $retval = $this->sybase_command("$SQLselect") unless ($error_string);
    } unless ($retval == 0) {

$error_string .= "<H2>There has been a problem:</H2>\n";
        $error_string .= "Your Article \'<I>$filename</I>\' ";
        $error_string .= "could not be deleted -- there has been an unaccounted ";
```

FIG. 5G

```
        $error_string .= "for problem with the Sybase SQL Server!<BR>\n";

}

`rm -f $SQLselect`;

`rm -f $fullrmfile` unless $error_string;

if (!$error_string) { return ( ");

} else { return ($error_string);
}
```

FIG. 5G (CONT.)

```
} sub check_employee {
my  $this = shift;
my $name = shift;
my $id_holder = '';
my $SQLselect = '';
my $retval = '';
my ($retval, $syspasswd, $uid, $gid, $quota, $comment, $gcos, $dir, $shell)
 = '';

return ('NULL') if (!$name);

$retval = int($name);

if($retval != 0) {

$retval = int($retval/100);

$SQLselect = $this->write_temp_file ("get_all_emp_id
\'$retval\',\'char\'");
        $_ = $this->sybase_command("$SQLselect");
        `rm $SQLselect`;

if (/error:.*/) {
            $retval = 'error:';

} elsif ($_eq 'NULL' || $_eq") {

$retval = 'NULL';

} else {

$retval = $_;
            $id_holder = $_;

}

} else {

$id_holder = $name;

```perl
            ($retval, $syspasswd, $uid, $gid, $quota, $comment, $gcos, $dir,
            $shell)
            = getpwnam($id_holder) if ($retval ne 'error:' || $retval ne 'NULL');

return ($retval);

} sub get_employee_id {
my $this = shift;
my $id = shift;
my $retval = '';
my $SQlselect = '';

return ('') if (!$id);

$SQLselect = $this->write_temp_file ("get_all_emp_id \ '$id\',\'num\'");
$_ = $this->sybase_command("$SQLselect");
```

FIG. 5H (CONT.)

```
`rm $SQLselect`;

if (/error:.*/) {

$retval = 'error:';

} elsif ($_eq 'NULL' || $_eq '') {

$retval = 'NULL';

} else {

$retval = $_;

} return ($retval);

} sub sybase_command {
my $this = shift;
my $SQLfile = shift;
my $results = '';

if (open (SYBASE, "$this->{sybase_utility} $SQLfile |")) {
        while (<SYBASE>) { chomp;
            $results .= "$_";
        }

} else { close(SYBASE);
        return ('911');

} close(SYBASE);

$_ = $results;

if (/^results:[ \s+\t+](.*)$/) {
```

FIG. 5I

```
            return ($1);
        } else {
            return ($_);
        }
    } sub write_temp_file {
my $this = shift;
my $command_text = shift;
my $pid = $$;

open (OUT,">/tmp/$pid");
```

FIG. 5I (CONT.)

```
    print OUT $command_text;
    close OUT;
    return ("/tmp/$pid");

}

# ***********************************
# END OF PACKAGE
# ***********************************

1;

__END__
```

FIG. 5J

METHOD AND SYSTEM FOR ELECTRONIC ARTICLE SUBMISSION

TECHNICAL FIELD

This invention relates to electronic document management. Specifically, the present invention relates to submitting articles into an electronic document management system.

BACKGROUND ART

The Internet, including the World Wide Web (hereinafter the Web), makes a large amount of information accessible to anyone connected to the Internet. In order to access the Internet, a user typically subscribes to an on-line service provider. Using, for example, a modem coupled to a computer, the user contacts the service provider who, in turn, connects the user to the Internet. Once the user is coupled to the Internet, the user is said to be "on-line" (a user who is not on-line is referred to as being "off-line"). When on-line, the user is able to access numerous resources available through conduits such as, for example, the Web.

The Web is comprised of voluminous linked "sites". Various linked Web sites contain information of virtually innumerable type, style, and content. Web sites are often comprised of a plurality of Web documents referred to as Web pages. In general, the layout language for a Web document is Hypertext Markup Language (HTML). Web documents are stored in HTML format in association with "server" software on remote servers. A Web document is given a "Universal Resource Locator" (URL) which is essentially an address path identifying the server which hosts the desired document plus the location of the document on the server. Using a "browser" software, an end-user can send a request from a client computer to access a document stored at a particular URL. Browser software such as Netscape™ Navigator, of Netscape Communications Corporation of Mountain View, Calif., is well known and widely available. When the server receives the user's request, it sends the requested HTML Web document to the client where the document can be displayed. The communications protocol used in making such a request and in transferring Web documents is "Hypertext Transfer Protocol" (HTTP). For more information about the Web, see for example T. Berners-Lee, R. Cailliau, A. Loutonen, H. F. Nielsen, and A. Secret, "The World Wide Web," *Communications of the ACM*, vol. 37(8), August 1994.

In addition to the Internet, other "limited access on-line" information retrieval systems such as "Intranet" systems also exist. An Intranet system operates in a manner similar to the manner in which a conventional Internet system operates. However, access to the Intranet is controlled/restricted, for example, to a specific user group, or to users accessing the Intranet from specified locations. In a business environment, for example, an Intranet system containing information relevant to a particular business may only be accessed from terminals present on the grounds of the business. In so doing, it is presumed that the business' information will only be accessed by employees. Similarly, access to the Intranet can be limited only to users knowing, for example, a specific password. Thus, the business' Intranet system is not available to the general public. Like the Internet, information contained in an Intranet system is frequently arranged in Web sites comprised of various linked Web pages.

Although Internet and Intranet systems conveniently provide information to various users, loading or "submitting" articles into an Internet or Intranet system is often a complex and time-consuming task. Submitting articles to an Internet or Intranet system often requires an interative review process involving numerous review steps. Such steps can include, but are not limited to, reviewing the article for content, reviewing the article's grammar and other stylistic characteristics, and placing the article in a format suitable for display in an Internet or Intranet system. Thus, it can be quite difficult for the average Internet or Intranet user to submit an article into a desired Internet or Intranet system. Because it is so difficult for users to submit articles, many Internet or Intranet systems have one or more persons solely dedicated to submitting information into the Internet or Intranet system. Such persons are commonly referred to as webmasters. As a result of requiring a webmaster or webmasters, conventional Internet and Intranet systems have substantial additional cost associated therewith.

Thus, a need exists for a method and system which efficiently allows for the submission of articles into an Internet or Intranet system. A further need exists for a method and system which efficiently reviews an article for content and which reviews the article's grammar and other stylistic characteristics. Yet another need exists for a system and method which allows a user to readily place an article in a format suitable for display in an Internet or Intranet system.

DISCLOSURE OF THE INVENTION

The present invention provides a method and system which efficiently allows for the submission of articles into an Internet or Intranet system; a method and system which efficiently reviews an article for content and which reviews the article's grammar and other stylistic characteristics; and a system and method which allows a user to readily place an article in a format suitable for display in an Internet or Intranet system.

Specifically, in one embodiment, the present invention receives, in response to a web-based query form, a location of an electronic copy of an article which is desired to be submitted into an electronic document system. In the present invention, the article is accessible to the electronic document system. Next, the present invention forwards the received article to a universal resource locator corresponding to an article review site. At the article review site, the article is organized into a split-page format. That is, the article is organized such that electronic document system-based program code and meta-information representing the displayed appearance of the article is shown on one side of the display. The article itself is displayed on the other side of the display such that the result of alterations to the electronic document system-based program code on the display appearance of the article is readily observable. The present embodiment also prompts review of the article, if necessary. After the article is reviewed, the article is entered into the electronic document system.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 5A, 5B, 5C, 5D, 5E, 5F, 5G, 5H, 5I and 5J are portions of exemplary computer program code for implementing one embodiment of an AEDS system in accordance with the present invention.

BEST MODE FOR CARRYING OUT THE INVENTION

Figure 1:
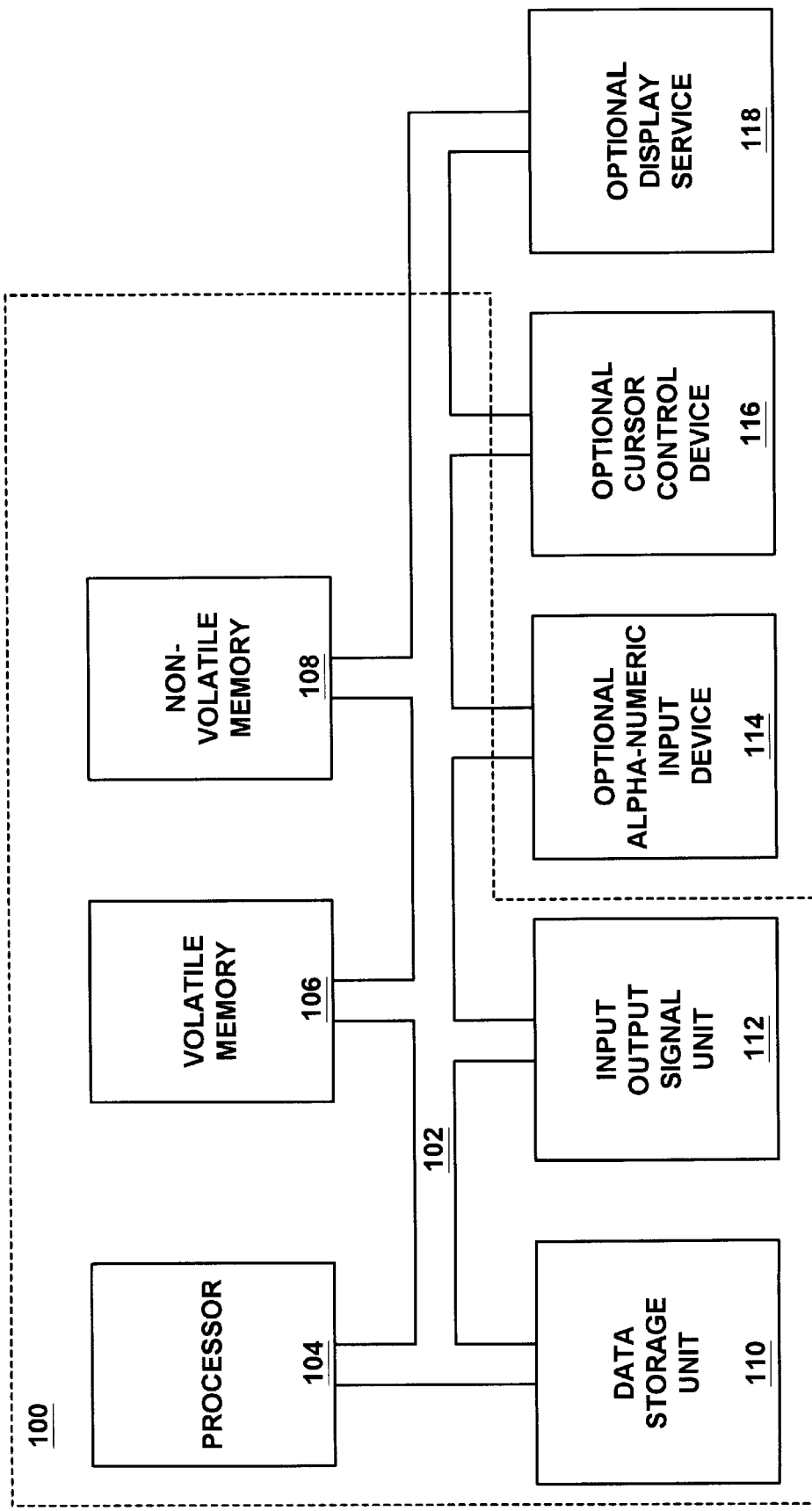
FIG. 1 is a schematic diagram of an exemplary computer system used as a part of an automated electronic document submission (AEDS) system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "reviewing," "notifying," "comparing," "displaying," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

With reference now to FIG. 1, portions of the present automated electronic document submission (AEDS) system are comprised of computer-readable and computer-executable instructions which reside, for example, in computer-usable media of a computer system. FIG. 1 illustrates an exemplary computer system 100 used as a part of an AEDS system in accordance with the present invention. It is appreciated that system 100 of FIG. 1 is exemplary only and that the present invention can operate within a number of different computer systems including general purpose computers systems, embedded computer systems, and stand alone computer systems specially adapted for automatic system error analysis.

System 100 of FIG. 1 includes an address/data bus 102 for communicating information, and a central processor unit 104 coupled to bus 102 for processing information and instructions. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. A signal input output comm device 112 (e.g. a modem) coupled to bus 102 is also included in system 100 of FIG. 1. System 100 of the present AEDS embodiment also includes an optional alphanumeric input device 114 including alphanumeric and function keys is coupled to bus 102 for communicating information and command selections to central processor unit 104. System 100 also optionally includes a cursor control device 116 coupled to bus 102 for communicating user input information and command selections to central processor unit 104. System 100 of the present embodiment also includes an optional display device 118 coupled to bus 102 for displaying information.

Display device 118 of FIG. 1, utilized with the present AEDS system, may be a liquid crystal device, cathode ray tube, or other display device suitable for creating graphic images and alphanumeric characters recognizable to a user. Optional cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for

GENERAL DESCRIPTION OF THE AUTOMATIC SYSTEM ERROR ANALYSIS SYSTEM OF THE PRESENT INVENTION

Figure 2:
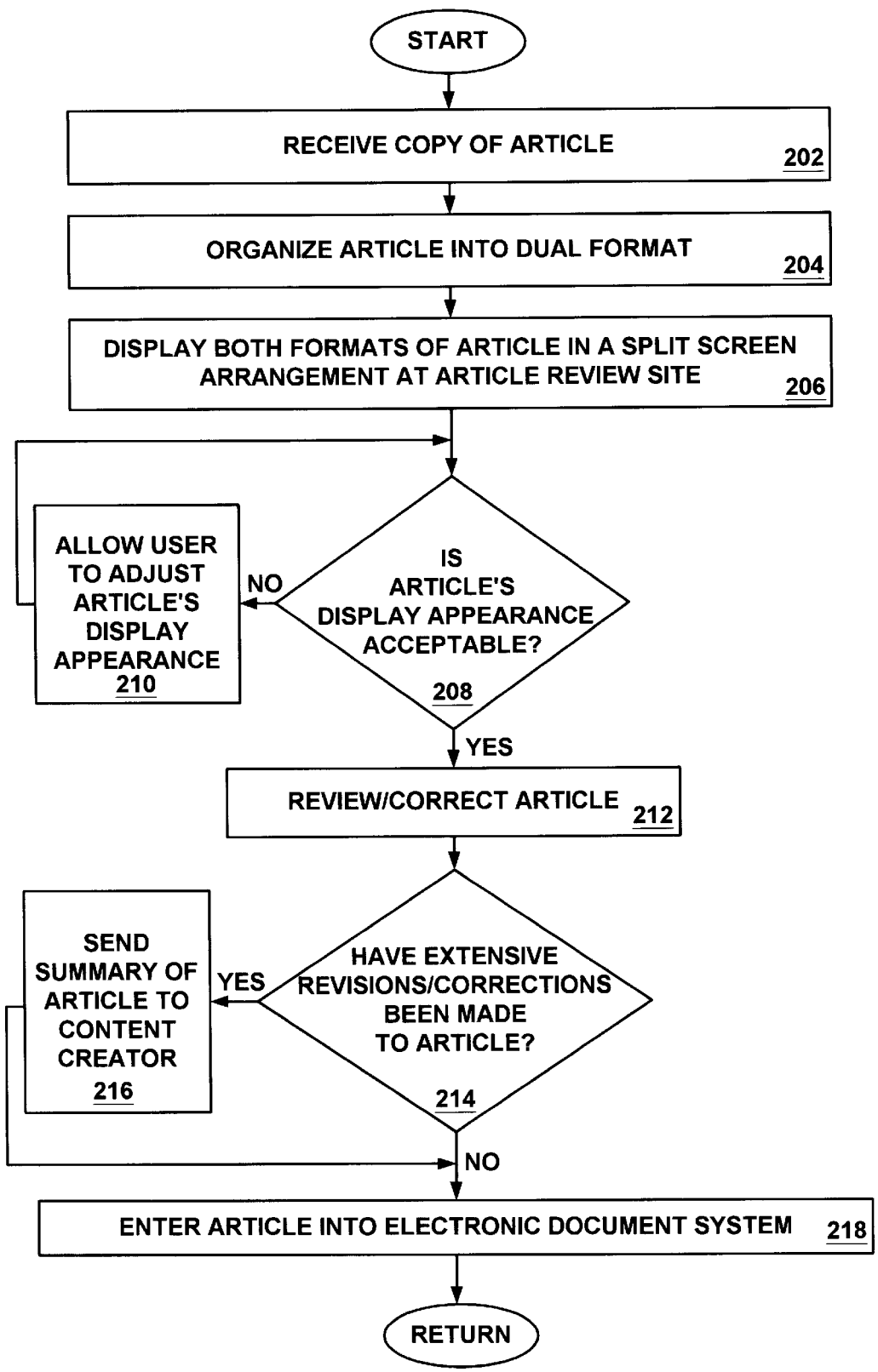
FIG. 2 is a flow chart illustrating steps performed by one embodiment of the present AEDS system in accordance with the present claimed invention.

With reference next to FIG. 2, a flow chart 200 of steps used by one embodiment of the present AEDS system is shown. Flow chart 200 includes processes of the present AEDS system which are comprised of computer-readable and computer-executable instructions. The computer-readable and computer-executable instructions reside, for example, in data storage features such as computer usable volatile memory 106 and/or computer usable non-volatile memory 108. The computer-readable and computer-executable instructions are used to control, for example, the operation and functioning of central processor unit 104. In step 202, the present invention receives a copy of an article which a user desires to enter into an electronic document system. In the present embodiment, the present invention receives an electronic copy of the article which the user desires to enter into the electronic document system. For purposes of the present application, the electronic document system is comprised, for example, of the Internet or an Intranet. However, the present invention is also well suited to use with various other type of electronic document systems. In the present embodiment, a user of the AEDS system electronically mails the desired article to a universal resource locator (URL), or e-mail address corresponding to the location of the present AEDS system. The present invention is, however, well suited to receiving the electronic copy of the desired article through various other methods.

Referring next to step 204, the present invention then organizes the article into a dual format. That is, the present invention organizes the article such that both the actual appearance of the article and the computer code (i.e. the electronic document system-based code) used to generate the actual appearance of the article can be displayed together. More specifically, in the present embodiment, the article is organized such that the computer code, such as, for example, Hypertext Mark-up Language (HTML), used to generate the appearance of the article is displayable next to the actual article. In so doing, the present invention allows a user to alter the computer code and readily observe the effect of the alteration on the appearance of the article. Thus, a user an easily achieve a desired article appearance by manipulating the computer code. The present embodiment of the AEDS system then forwards the dual-formatted article to a URL or e-mail address corresponding to an article review site.

At step 206, the present invention then displays both formats (i.e. the computer code and the corresponding article) in a split screen arrangement at the article review site. In the present embodiment, the computer code is displayed in one window on the display screen and the corresponding article is displayed in another window on the display screen. The present invention is also well suited to having the computer code and the article displayed in various other arrangements on a display at the article review site.

As shown in steps 208 and 210, if the appearance of the article is not acceptable or as desired by the user of the present AEDS system, the present invention allows the user to alter the computer thereby changing the appearance of the article. Once the appearance of the article is as the user desires, the present invention proceeds to step 212.

At step 212, the present embodiment of the present AEDS system review and/or corrects the present article. That is, the present invention prompts an article reviewer(s) to check, for example, the technical accuracy of the article, the article's grammar, the validity of hypertext links to other articles, the validity of the HTML code, and the stylistic characteristics of the article. Although such features are reviewed in the present embodiment, the present invention is well suited to reviewing various other features of an article depending upon the user's particular needs or desires.

Next, at step 214, the present embodiment of the AEDS system determines whether extensive revisions and/or corrections have been made to the article. In the present embodiment, the AEDS system determines whether extensive changes have been made to the computer code, and also whether extensive changes have been made to the technical, grammatical, and stylistic features of the present invention.

As shown in step 216, the present embodiment of the AEDS system sends a summary of the article to the content creator if extensive changes have been made to the article. In the present embodiment, the AEDS system e-mails or otherwise electronically forwards the summary to the content creator. The present invention is, however, well suited to forwarding the article to the content creator using various other methods. Thus, in the present embodiment, the content creator of the article is made aware of the fact that the article was extensively altered by the present AEDS system.

Next, as shown at step 218, the present invention enters the article into the electronic document system. Additionally, the present embodiment is also well suited to entering metadata (e.g. identifying information such as the title, content, and the like) of the article into, for example, a relational database management system, a flat file database, or other database system.

An example of computer-readable and computer-executable instructions for performing the present embodiment are partially shown below. The reminder of the exemplary computer-readable and computer-exacutable instructions (computer program code) are shown in FIGS. 5A, 5B, 5C, 5D, 5E, 5F, 5G, 5H, 5I and 5J. As mentioned above, such computer-readable and computer-executable instructions reside, for example, in data storage features such as computer usable volatile memory 106 and/or computer usable non-volatile memory 108 of FIG. 1.

```
sub new {
    my $holder = shift;
    my $type = ref($holder) || $holder;
    my $this = {};
    return bless $this, $type;
}
sub get {
```

-continued

```
my $this = shift;
        my ($name) = @_;
        return $this->{$name};
}
sub set {
my $this = shift;
        my (%pairs) = @_;
        foreach (keys(%pairs)) {
              $this->{$_} = %pairs{$_};
        }
}
sub date {
my $this = shift;
    my %retval = 'date +%d.%m:19%y';
    chomp($retval);
    return ($retval);
}
sub html_get_text {
#my $this = shift;
my $infile = shift;
    open (INFILE, "$infile");
    while (<INFILE>) {
        print $_;
    }
}
sub get_file_contents {
my $this = shift;
my $infile = shift;
my $contents = '';
    open (INFILE, "$infile");
    while (<INFILE>) {
        $contents .= $_;
    }
    return ($contents);
}
sub get_version_from {
        return (  'None', 'v3.0a','v3.1a','v3.1b','v3.2a','v3.2b','v3.3a','v3.3b','v3.4a', 'v3.4b',
              'v3.5a', 'v3.5b','v7.0','1997.01','1997','current');
}
sub get_version_to {
        return (
'None', 'v3.0a','v3.1a','v3.1b','v3.2a','v3.2b','v3.3a','v3.3b','v3.4a', 'v3.4b', 'v3.5a',
             'v3.5b','v7.0','1997.01','1996','1997','current');
}
sub get_formats {
        return('HTML');
}
sub get_in _or_ex {
        return('Internal', 'External');
}
sub get_review_stage {
        my $this = shift;
        my $review_type = shift;
              return ('in','Grammatical','new-in','Technical') if ($review_type eq "new");
              return('upd', 'Grammatical','upd-in', 'Technical') if ($review_type eq "update");
}
sub check_technical_reviewer {
my $this = shift;
my $user = shift;
my $confirm = "\'<I>$user</I>\' is not a Technical reviewer.";
my ($tool_holder, $technical, $grammatical) ='';
    open(TOOLFILE, $this->{tool_file});
    while(<TOOLFILE>) {
        chomp;
        $_ =~ tr/\t/ /;
        ($tool_holder, $technical, $grammatical) = split (/ /);
        if ($user eq $technical) {
            $confirm = '';
        }
    }
    return ($confirm);
}
sub check_grammatical_reviewer {
my $this = shift;
my $user = shift;
my $confirm = "\'<I>$user</I>\' is not a Grammatical reviewer.";
my ($tool_holder, $technical, $grammatical) ='';
    open(TOOLFILE, $this->(tool_file);
    while(<TOOLFILE> {
```

-continued

```
            chomp;
            $_ =~ tr/\t/ /;
            ($tool_holder, $technical, $grammatical) = split (/ /);
            if ($user eq $grammatical) {
                $confirm = '';
            }
        }
    }
    return ($confirm);
}
sub get_default_reviewer {
my $this = shift;
my $tool = shift;
my $stage = shift;
my $default = '';
my ($tool_holder, $technical, $grammatical) ='';
    open(TOOLFILE, $this->{tool_file});
    while(<TOOLFILE>) {
        chomp;
        $_ =~ tr/\t/ /;
        ($tool_holder, $technical, $grammatical) = split (/ /);
        if ($tool_holder eq $tool) {
            $default = $technical if ($stage eq 'in' || $stage eq 'upd' ||
                $stage eq 'rjt-rev' || $stage eq 'rjt-upd-
rev');
            $default = $grammatical if ($stage eq 'rev' || $stage eq 'upd-rev' ||
                $stage eq 'rjt-dkd' || $stage eq 'rjt-upd-
dkd');
        }
    }
    return ($default);
}
sub check_reviewer {
my $this = shift;
my $reviewer = shift;
my $stage = shift;
my $default = '';
my $alternative ='';
my ($tool_holder, $technical, $grammatical) = '';
    open(TOOLFILE, $this->(tool_file});
    while(<TOOLFILE>) {
        chomp;
        $_ =~ tr/\t/ /;
        ($tool_holer, $technical, $grammatical) = split (/\s+/);
        $default = $technical if ($stage eq 'in' && $reviewer eq $technical);
        $default = $technical if ($stage eq 'upd' && $reviewer eq $technical);
        $default = $grammatical if ($stage eq 'rev' && $reviewer eq $grammatical);
        $default = $grammatical if ($stage eq 'upd-rev' && $reviewer eq
$grammatical);
    }
    if($default) {
        return ('');
    } else {
        return ("\'<I>$reviewer</I>\' is not an approved review for that
tool!<BR>");
    }
}
sub get_actual_reviewer {
my $this = shift;
my $reviewer_stage = shift;
my $infile = shift;
my $data = '';
my $key = '';
my $error_string = '';
    $field = 'reviewed_by' if ($review_stage eq 'in' || $review_stage eq 'upd');
    $field = 'approved_by' if ($review_stage eq 'rev' || $review_stage eq 'upd-rev');
                use Sybase_env;
                use Sybase::DBlib;
                my $syb_user=Sybase_env->get_user;
                my $syb_passwd=Sybase_env->get_password;
                my $syb_server=Sybse_env->get_server;
                $dbh = Sybase::DBlib->dblogin($syb_user,$syb_passwd,$syb_server);
    $dbh->dbcmd("select $field from solvit_metadata where doc_id = \"$infile\"");
    $dbh->dbsqlexec;
    $dbh->dbresults;
    while(%data = $dbh->dbnextrow(1)) {
        $results = $data{'reviewed_by'} if ($data{'reviewed_by'});
        $results = $data{'approved_by'} if ($data{'approved_by'});
    }
    return ($results);
```

-continued

```perl
}
sub get_tools {
my $this = shift;
my @tools = ();
open(TOOLFILE, $this->{tool_file});
while(<TOOLFILE>) {
        chop;
        $_=~/^(\S+)\s+(\S+)\s+(\S+)/g;
        push@tools,$1) if ($1 ne '*');
    }
    return @tools;
}
sub get_sources {
my $this = shift;
my (@all_sources,@in_sources,@sources,$file,$source);
        if(!opendir(SRCDIR,"$this->{app_root}/uid/")) {
            print "<strong>Can't open $this->{app_root}/uid</strong>\n";
        } else {
            while ( $file = readdir(SRCDIR)) {
                next if($file eq "." || $file eq ".." || $file =~ /Archive$/ ||
                        $file =~ /Graphics$/);
                if(-f "$this->{app_root}/uid/$file") {
                    $file =~ /uid.(.*)/;
                    push(@all_sources,$1) if ($1);
                }
            }
        }
        close(SRCDIR);
        foreach (@all_sources {
            if(!-d ∂$this->{source_dir}/$_") {
                $_ .= "- Internal";
            }
            push(@sources,$_);
        }
        return(@sources);
}
sub get_dir_list {
my $this = shift:
my $user_dir = shift;
my @file_list = ();
my @list_holder = ();
        if(opendir (SUBDIR, "$this->{queue_dir}/$user_dir")) {
            while( $file = readdir(SUBDIR)) {
                next if($file eq "." || $file eq "..");
                push (@file_list, $file);
            }
            closedir SUBDIR;
        } else {
            return;
        }
        foreach (@file_list) {
            push (@list_holder, $_) unles (/.*~/);
        }
        if (@list_holder }
            return((@list_holder);
        } else {
            return;
        }
}
sub retrieve_production_article_from_file {
my $this = shift;
my $article = shift;
my $control = shift;
my $filename = shift;
my $data = ";
my $key = ";
my $error_string = ";
my $infile = ";
my $user_dir = ";
my $content = ";
my $origin = $article->get('prod_locale');
        if(!$filename) {
            $key = 'ERROR::' if (!$error_string);
            $error_string .= "$key<H2>There has been a problem:</H2>\n";
            $error_string .= "Ensure the <B>Article name </B> (eg. some_article.html)
";
            $error_string .= "you want to retrieve is valid.<BR>\n";
        }
        $origin = 'ex' if($origin eq 'External');
```

-continued

```
    $origin = 'in' if($origin eq 'Internal');
    $SQLselect = $this->write_temp_file ("select doc_id,written_by from
solvit_metadata where origin = \'$origin\' AND doc_id = /"$filename\"") if
($filename);
    $data = $this->sybase_command("$SQLselect") unless (!$SQLselect);
    $_= $data;
    unless (/^.*results:[\s+\t+]([aA-zZ0-9._-]{1,})[\s+\t+]([aA-zZ]{1,})/i ||
        /^([aA-zZ0-9._-]{1,})[\s+\t+]([aA-zZ]{1,})/i) {
        $key = 'ERROR::' if (!$error_string);
        $error_string .= "$key<H2>There had been a probelm:</H2>\n";
        $error_string .= "The Article \'<I>$filename</I>\'";
        $error_string .= "could not be retrieved -- there has been an unaccounted
";
        $error_string .= "for problem with the Sybase SQL Server! Ensure the ";
        $error_string .= "<B>full</B> Article name (eg.
/full/unix/path/and/article_name) ";
        $error_string .= "you want to retrieve is valid.<BR>\n";
    }
    'rm $SQLselect' unless (!$SQLselect);
    $user_dir = $this->get_employee_id ($2) if ($2);
    $infile = "$this->{queue_dir}/$user_dir/$1";
    if(open(INFILE, $infile)) {
        while(<INFILE>) {
            chomp;
            $content .= $_;
        }
        close (INFILE);
        return ($content);
    { else }
        $key = 'ERROR::' if (!$error_string);
        $error_string .= "$key<H2>There has been a probelm:</H2>\n";
        $error_string .= "Your Article \'<I>$article->{filename}</I>\'";
        $error_string .= "could not be retrieved from production.<BR>\n";
        return ($error_string);
    }
}
sub initialize_article_from_file {
my $this = shift;
my $article = shift;
my $control = shift;
my $content = '';
my $infile = '';
my $error_string = '';
    $user_dir = $this->get_empolyee_id ($article->{user}) if ($article->{user});
    $infile = "$this->{queue_dir}/$user_dir/$article->{filename}";
    if (open(INFILE, $infile)) {
        while(<INFILE>) {
            chomp;
            $content .= $_;
        }
        close (INFILE);
        return ($content);
} else {
        $error_string .= "ERROR::<H2>There has been a problem:</H2>\n";
        $error_string .= "Your Article \'<I>$article->{filename}</I>\'";
        $error_string .= "could not be retrieved from the location ";
        $error_string .= "\'<I>$this->{queue_dir}/$user_dir</I>.\'<BR>\n";
        return ($error_string);
    }
}
sub save_article_to_file {
my $this = shift;
my $article = shift;
my $control = shift;
my $control = '';
my $error_string = '';
my %outdir = ();
my %rmdir = ();
my $fulloutfile = '';
my $action = '';
my $line1 = '';
my $line2 = '';
my $SQLcommmand = '';
my $retval = '';
my $command = '';
my $accept = '';
my $outfile = $article->get ('filename');
my $origin = $article->get ('in_or_ex');
my $doc_size = $article->get_size ('content');
```

-continued

```
my $today = $this->data (); $article->set (date => $today);
my $stage = $article->get('review_stage');
my $db_action = $article->get('db_action');
my $what = $article->get('what');
my $author = $article->get('author');
my $reviewer = $article->get('reviewer');
my $old_author = $article->get('old_author');
my $old_reviewer = $article->get('old_reviewer');
my $user = $article->get('user');
    $author = $this->get_employee_id ($author)      if ($author);
    $reviewer = $this->get_employee_id ($reviewer)      if ($reviewer);
    $old_author = $this->get_empolyee_id ($old_author)      if ($old_author);
    $old_reviewer = $this->get_employee_id ($old_reviewer)      if ($old_reviewer);
    $user = $this->get_employee_id ($user)      if ($user);
    $temp_user = $this->get_employee_id ($user)      if ($user);
    if ($reviewer eq 'error:' || $author eq 'error:' || $old_reviewer eq 'error:' ||
        $old_author eq 'error:' || $user eq 'error:') {
        $error_string .= "There has been an cryptic error in the realm of
username<->id mapping.<BR>";
    }
        if(!$reviewer)
        {
            $reviewer=0;
        }
    }
    if (($stage eq 'in' || $stage eq 'hold-in') && $db_action eq 'insert') {
        $error_string = $this->check_unique_filename($article,$control) unless
($error_string);
    }
    if ($stage eq 'upd-sub') {
        my $t_origin;
            $t_origin = 'ex' if ($origin eq 'External');
                $t_origin = 'in' if($origin eq 'Internal');
                    use Sybase_env;
                    use Sybse::DBlib;
                    my $syb_user=Sybase_env->get_user;
                    my $syb_passwd=Sybase_env->get_password;
                    my $syb_server=Sybase_env->get_server;
                    $dbh = Sybase::DBlib->dblogin($syb-user,$syb_passwd,$syb_server);
                    $dbh->dbcmd("select upd_emp_id=emp.employee_id
                                from info_mgr..employees emp,
                                solvit..solvit_metadata meta
                                where emp.login_name=meta.updated_by
                                and meta.doc_id=\"$outfile\"
                                and meta.origin=\"t_origin\"");
                    $dbh->dbsqlexec;
                    $dbh->dbresults;
                        while(%data = $dbh->dbnextrow(1))
                        {
                            $rmdir{'upd_emp_id'} = "$this-
>{queue_dir}/$data{'upd_emp_id'}";
                        }
    }
    if ($control->{next_action} eq 'Submit Article' || $control-><next_action} eq
'Reject Article') {
```

Figure 3:
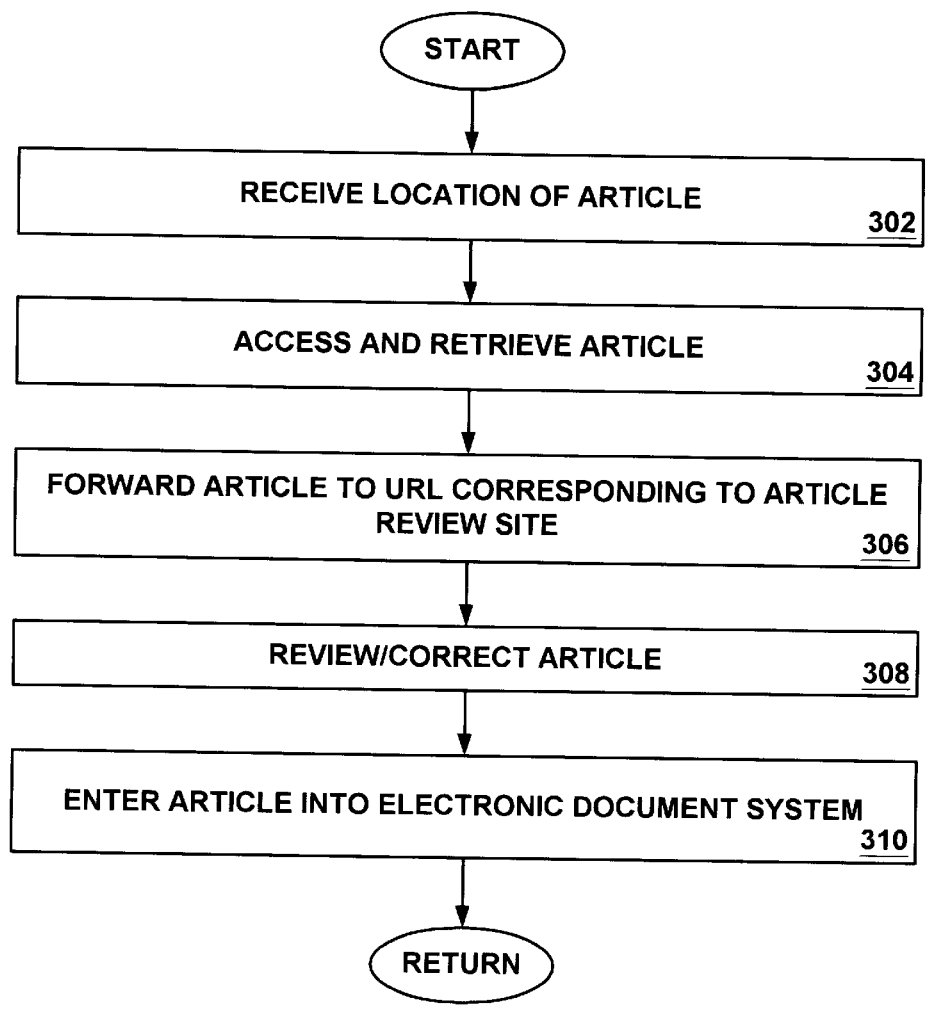
FIG. 3 is a flow chart illustrating steps performed by another embodiment of the present AEDS system in accordance with the present claimed invention.

With reference next to FIG. 3, a flow chart 300 of steps used by another embodiment of the present AEDS system is shown. Flow chart 300 includes processes of the present AEDS system which are comprised of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control, for example, the operation and functioning of central processor unit 104. In step 302, the present embodiment of the AEDS system receives the location (e.g. the e-mail address, the URL, the directory and file, and the like) of an article which a user desires to enter into an electronic document system. In the present embodiment, the location is received in response to a web-based query form which directs a user to enter the location of an article which the user desires to enter into the electronic document system. Although such an approach is used to prompt an article's location in the present embodiment, the present invention is also well suited to using various other methods to prompt a user to submit an article's location. Additionally, the present invention is also well suited to receiving respective locations of a plurality of articles which the user desires to enter into the electronic document system.

Next, at step 304, the present embodiment accesses and retrieves the article using the location received in step 302. Thus, in the present embodiment, the article is electronically accessible by the present AEDS system.

At step 306, the present embodiment of the AEDS system then forwards the retrieved article to a URL or e-mail address corresponding to an article review site.

As shown in step 308, the present embodiment then reviews the retrieved article. That is, the present invention prompts an article reviewer(s) to check, for example, the technical accuracy of the article, the article's grammar, the validity of hypertext links to other articles, the validity of the HTML code, and the stylistic characteristics of the article. Although such features are reviewed in the present embodiment, the present invention is well suited to reviewing various other features of an article depending upon the user's particular needs or desires.

Next, as shown at step 310, the present invention enters the article into the electronic document system. Additionally, the present embodiment is also well suited to entering metadata (e.g. identifying information such as the title, content, and the like) of the article into, for example, a relational database management system, a flat file database, or other database system.

Figure 4:
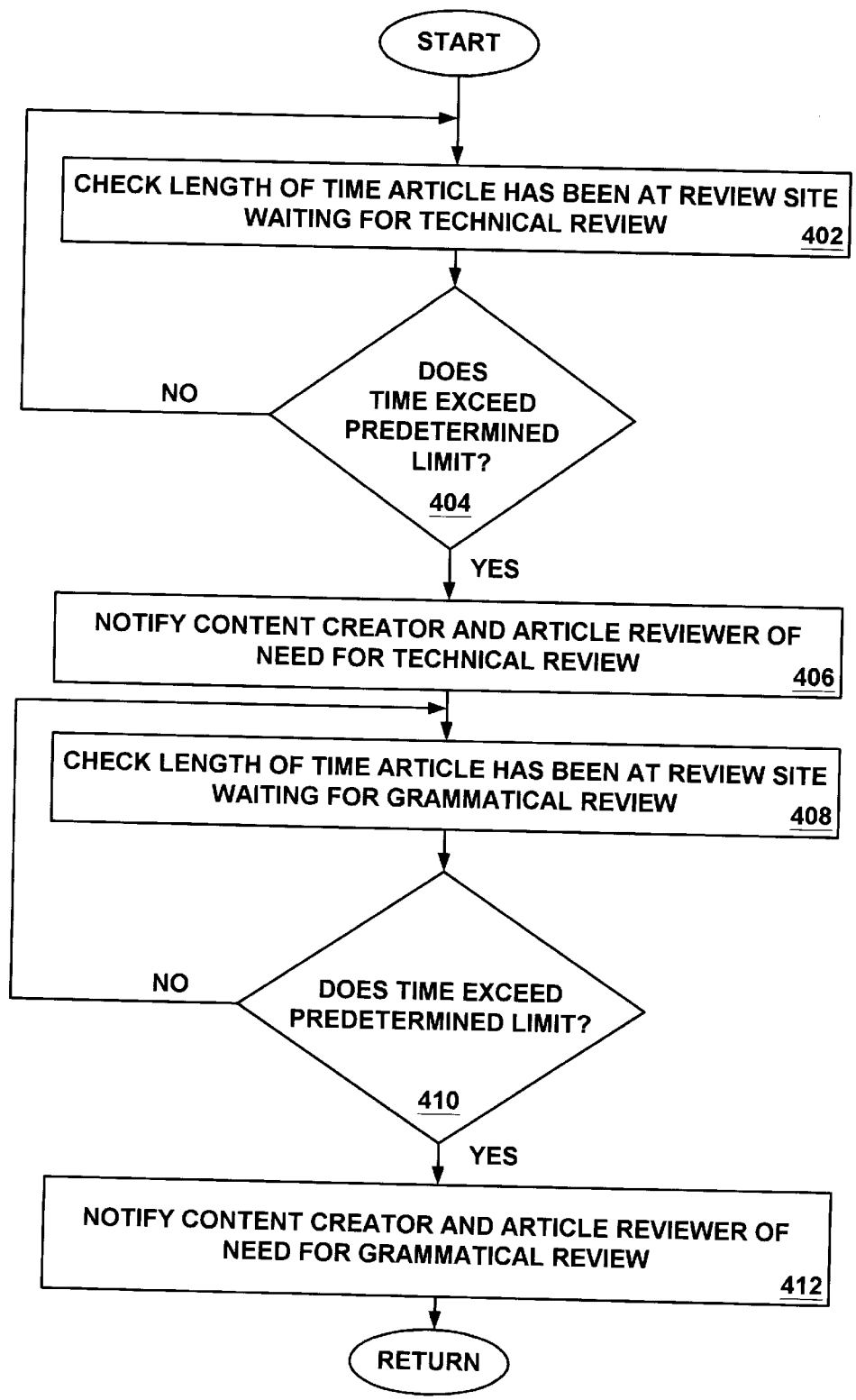
FIG. 4 is a flow chart illustrating steps performed by still another embodiment of the present AEDS system in accordance with the present claimed invention.

With reference next to FIG. 4, a flow chart 400 of steps used by another embodiment of the present AEDS system is shown. Flow chart 400 includes processes of the present AEDS system which are comprised of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control, for example, the operation and functioning of central processor unit 104. In step 402, after an article has been forwarded to an article review site, the present embodiment of the AEDS system checks the length of time that the article has been at the article review site awaiting technical review. In the present embodiment, the article was forwarded to the article review site using, for example, the methods recited in conjunction with the embodiment of FIG. 2 or FIG. 3. The present embodiment is also well suited to operating in conjunction with an article forwarded to the article review site via various other methods.

In step 404, the present embodiment determines whether the article has been waiting for technical review for a time period which exceeds a predetermined limit. In the present embodiment, the predetermined time limit is set at 5 days. Although such a predetermined time limit is set in the present embodiment, the present invention is also well suited to having various other time limits for technical review. If the time period does not exceed the predetermined time limit, the present invention repeats step 402 as shown. If the time period does exceed the predetermined time limit, the present invention proceeds to step 406.

At step 406, the present invention notifies the content creator and an article reviewer(s) of the need for technical review. In the present embodiment, the content creator and article reviewer are notified via e-mail. Although such a notification method is employed in the present embodiment, the present invention is also well suited to using various other notification methods.

In step 408, the present embodiment of the AEDS system then checks the length of time that the article has been at the article review site awaiting grammatical review.

In step 410, the present embodiment determines whether the article has been waiting for grammatical review for a time period which exceeds a predetermined limit. In the present embodiment, the predetermined time limit is set at 2 days. Although such a predetermined time limit is set in the present embodiment, the present invention is also well suited to having various other time limits for grammatical review. If the time period does not exceed the predetermined time limit, the present invention repeats step 408 as shown. If the time period does exceed the predetermined time limit, the present invention proceeds to step 412.

At step 412, the present invention notifies the content creator and an article reviewer(s) of the need for grammatical review. In the present embodiment, the content creator and article reviewer are notified via e-mail. Although such a notification method is employed in the present embodiment, the present invention is also well suited to using various other notification methods.

Although the present embodiment checks for delays in technical and grammatical review, the present invention is also well suited to check for delays in reviewing various other aspects of the article. For example, the present invention is also well suited to check for delays in reviewing the validity of hypertext links to other articles, the validity of the HTML code, and the stylistic characteristics of the article and various other features of an article depending upon the user's particular needs or desires.

An example of computer-readable and computer-executable instructions for performing the present embodiment are given below. As mentioned above, such computer-readable and computer-executable instructions reside, for example, in data storage features such as computer usable volatile memory 106 and/or computer usable non-volatile memory 108 of FIG. 1.

```
# ! /u/ypaik/bin/perl
use Getopt: : Long;
GetOptions ( 'a | age=i' , 'd | directory=s' );
@valid_executors= ( "solvitsub",
                    "ypaik");
%notify_dirs=("/ remote / sire1 / external_review/ ", " rev ",
              " / remote / sire1 / solvit / external_dkd/ ", "dkd" );
$dev=1;
chop($whoami= 'whoami ');
if ( ! grep (/ ^$whoami$ / , @valid_executors) || $whoami = ~/ ^ \s * $ /) {
    die ("This script must be run as the user \ "solvitsub\ "");
}
foreach $notify_dir (keys %notify_dirs) {
    $rev_type= $notify_dirs ($notify_dir) ;
    @users = ();
    opendir (NOTIFY_DIR, $notify_dir) || die ( "could not open the directory
$notify_dir") ;
        @users=sort (grep( !- f & & !/ ^\ . /, readdir(NOTIFY_DIR) ) ) ;
        foreach $user (@users) {
            print "$user, $rev-type\n";
            opendir (USER_DIR, "$notify_dir / $user " ) || die (" Could not open
the directory $noti
```

```
        fy_dir / $user " );
            @files=sort (grep (!/ ^\./, readdir (USER_DIR) ) ) ;
            closedir (USER_DIR) ;
            foreach $file (@files) {
                print " \ t Sfile\n";
            }
        }
    }
}
exit;
sub send_mail (
    local    ($to, $from_addr, $cc, $reply_to, $errors_to, $subject, $contents) =
@_;
    open (MAIL, " | /usr/ lib/ sendmail -oi -t" ) | | die ("Can't send mail\n");
    if($dev) {
        print MAIL "To: $submit_maintainer\n";
        print MAIL "From: solvitsub\n";
        print MAIL "Subject: SOLV-IT! Submission system in Dev mode\n\";
        print MAIL "This is the message I would have sent out: \n\n";
    )
    print MAIL "To: $to\n";
    print MAIL "From: $from_addr\n";
    print MAIL "Errors-To: $errors_to\n" if ($errors_to!~ / ^ /s*$/);
    print MAIL "Reply_To: $reply_to/n";
    print MAIL "Cc: $cc\n" if ($cc? ~ / ^\s*$/);
    print MAIL "Subject: $subject\n\";
    print MAIL "$contents\n";
    close MAIL;
}
#! /usr/local/bin/sybperl
$cc= "jmk ypaik";
$debug = 1;
These are temporary
sub    log {
        print ("@_" ) ;
}
sub fatal (
        die ("@_" );
}
sub error {
        warn ( "@_") ;
}
# Set up some initial parameters
$ | =1;
$ENV ('DSQUERY' ) = "SYB_PROD01";
$sourcefile="/home/solvitsub/dbase/source_decriptions";
chop ($user= 'whoami') ;
#       Get the info for which files to archive
if ($#ARGV != 2) }
        die ("
        usage: $0 endversion toolabbreviation origin\n    where: origin is { in | ex } \n");
}
&load_sources;
($version_to, $product_code, $origin) = @ARGV;
@archfiles=&archive_list (@ARGV) ;
@archfiles=&archive_list (@ARGV) ;
foreach $archfile (@archfiles) {
        next if ($archfile = ~ /_deleted/) ;
        next if ($archfile = ~ /Archive/) ;
        ($doc_id) = $archfile = ~/\/ ([ ^\/]+)$/;
        ($source) = $archfile = ~/\/([ ^\/]+)\/$doc_id$/;
        $body {$source}. = "Archive: $doc_id\n";
}
$subj = "Archived SOLV-IT! articles";
foreach $key (keys %body) {
        &mail_off( "key-$origin", $user, $subj, "$body {$key} \n"," " );
#       print       " ($to, $user, $subj, $body {$key} ) \n";
}
print "Done \n";
exit 0;
sub archive_list {
        local ($origin, $version_to, $product_code) = @_;
        local (@results, @out) = ( ) ;
        $dbproc=&dblogin ("solvit", "solvit");
        &dbuse ($dbproc, "solvit" ) ;
        &dbcmd ($dbproc, "solvit_metadata_archive \ "$origin\",
        \" $version_to\", \ "
        $product_code\"" );
        &dbsqlexec($dbproc) ;
        &dbresults($dbproc) ;
```

-continued

```
            while (@results = &dbnextrow ($dbproc)) {
                for $i    (0..$#results) {
                    $results [$i] = ~ s / \ s + / / g;
                }
                @out= (@out, @results) ;
            }
        }
        &dbclose ($dbproc) ;
        return @out;
        }
sub load_sources {
        open (SOURCEFILE, $sourcefile) | | die ("This program must be run on tiedye");
        @line=<SOURCEFILE>;
        close (SOURCEFILE) ;
        foreach $n (0..$# lines) {
            if ($lines [$n] =~ / name: \ s* ( [ ^ \s] + ) \ s * /) {
                ($source) = $1;
                ($abrv {$source} ) =$lines [$n+1] = ~ / ^abbrev: \ s * ( [ ^ \ s* /;
            }
        }
}
sub mail_off {
        local ($to, $from, $subj, $cont, $cc) =@_;
        if ($debug==1) {
            print "To: $to\n";
            print "From: $from \n";
            print "Cc: ypaik\n";
            print "Subject: $subj\n\n";
            print "$cont\ n";
        }
else    {
        open (MAIL, "| /usr / lib / sendmail -oi -t" ) | | die ( "Can't send mail\n ) ;
        print "To: $to\n";
        print "From: $from \n";
        print "Cc: ypaik\n";
        print "Subject: $subj\n\n";
        print "$cont\ n";
        close (MAIL) ;
        }
}
```

The present AEDS system is also able to use the various above-described embodiments in conjunction with each other. For example, the present invention is well suited to having the embodiment of FIG. 2 electronically receive a location as described in steps 302 and 304 of FIG. 3. Likewise, the present invention is well suited to using the embodiment of FIG. 4 in cooperation with the embodiments of FIGS. 2 and/or 3. In so doing, the present invention provides substantial versatility and numerous options for, submitting, reviewing, and entering articles into an electronic document system.

Thus, the present invention provides a method and system which efficiently allows for the submission of articles into an Internet or Intranet system; a method and system which efficiently reviews an article for content and which reviews the article's grammar and other stylistic characteristics; and a system and method which allows a user to readily place an article in a format suitable for display in an Internet or Intranet system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer system including a processor coupled to a bus, and a memory unit coupled to said bus for storing information, said memory unit having stored therein instructions that when executed implement a method for automated submission of an article into an electronic document system, said method comprising the computer-implemented steps of:

a) receiving an electronic copy of an article to be submitted into an electronic document system;

b) forwarding said received electronic copy of said article to an article review site, said step of forwarding said received electronic copy of said article to an article review site further comprising the steps of:

b1) organizing said electronic copy of said article in a dual format, both portions of said dual format concurrently displayable on a single common display at said review site;

b2) organizing said electronic copy of said article such that electronic document system-based program code representing the display appearance of said electronic copy of said article is displayed on said single common display at said article review site; and b3) displaying said electronic copy of said article corresponding to said electronic document system-based program code such that the result of alterations to said electronic document system-based program code on said display appearance of said electronic copy of said article is readily observable; and c) entering said article into said electronic document system after said article has been reviewed at said article review site.

2. The computer system of claim 1 wherein step a) of said computer-implemented method further comprises the steps of:

a1) receiving a location of said electronic copy of said article desired to be entered into said electronic document system, said electronic copy of said article accessible to said electronic document system.

3. The computer system of claim 2 wherein step a1) of said computer-implemented method further comprises the step of:

receiving, in response to a web-based query form, said location of said electronic copy of said article desired to be entered into said electronic document system.

4. The computer system of claim 1 wherein step a) of said computer-implemented method further comprises receiving an electronic copy of an article to be submitted into the Internet.

5. The computer system of claim 1 wherein step a) of said computer-implemented method further comprises receiving an electronic copy of an article to be submitted into an Intranet system.

6. The computer system of claim 1 wherein step b) of said computer-implemented method further comprises:

forwarding said received electronic copy of said article to a universal resource locator corresponding to said article review site.

7. The computer system of claim 1 wherein step b) of said computer-implemented method further comprises the step of:

having said electronic copy of said article reviewed for grammatical content.

8. The computer system of claim 1 wherein step b) of said computer-implemented method further comprises the step of:

having said electronic copy of said article reviewed for stylistic characteristics.

9. The computer system of claim 1 wherein step b) of said computer-implemented method further comprises the step of:

having said electronic copy of said article reviewed for validity of hypertext links disclosed therein.

10. The computer system of claim 1 wherein step b) of said computer-implemented method further comprises the step of:

forwarding a summary of said electronic copy of said article to a content creator thereof after said electronic copy of said article has been reviewed at said article review site.

11. The computer system of claim 1 wherein step b) of said computer implemented method further comprises the steps of:

b3) forwarding said electronic copy of said article to a hold directory at said article review site; and b4) notifying an article reviewer if said electronic copy of said article has not been reviewed after a predetermined period of time.

12. The computer system of claim 11 wherein step b4) of said computer implemented method further comprises:

notifying said article reviewer if said electronic copy of said article has not been reviewed for grammatical content after said predetermined period of time.

13. The computer system of claim 11 wherein step b4) of said computer implemented method further comprises:

notifying said article reviewer if said electronic copy of said article has not been reviewed for technical content after said predetermined period of time.

14. A computer-usable medium paying computer-readable program code embodied therein for causing a computer to perform the steps of:

a) receiving, in response to a web-based query form, a location of an electronic copy of an article desired to be submitted into an electronic document system, said electronic copy of said article accessible to said electronic document system;

b) forwarding said received electronic copy of said article to a universal resource locator corresponding to an article review site;

c) organizing said electronic copy of said article in a dual format, both portions of said dual format concurrently displayable on a single common display at said review site such that electronic document system-based program code representing the display appearance of said electronic copy of said article is displayed on said single common display at said article review site;

d) displaying said electronic copy of said article corresponding to said electronic document system-based program code such that the result of alterations to said electronic document system-based program code on said display appearance of said electronic copy of said article is readily observable;

e) prompting review of said electronic copy of said article; and f) entering said electronic copy of said article into said electronic document system after said electronic copy of said article has been reviewed at said article review site.

15. The computer-usable medium of claim 14 wherein said computer-readable program code embodied therein causes a computer performing step a) to further perform the step of:

receiving an electronic copy of an article to be submitted into the Internet.

16. The computer-usable medium of claim 14 wherein said computer-readable program code embodied therein causes a computer performing step a) to further perform the step of:

receiving an electronic copy of an article to be submitted into an Intranet system.

17. The computer-usable medium of claim 14 wherein said computer-readable program code embodied therein causes a computer performing step b) to further perform the steps of:

b1) forwarding said electronic copy of said article to a hold directory at said article review site.

18. The computer-usable medium of claim 17 wherein said computer-readable program code embodied therein causes a computer performing step e) to further perform the step of:

e1) notifying an article reviewer if said electronic copy of said article has not been reviewed for grammatical content after a predetermined period of time.

19. The computer-usable medium of claim 17 wherein said computer-readable program code embodied therein causes a computer performing step e) to further perform the step of:

e1) notifying an article reviewer if said electronic copy of said article has not been reviewed for technical content after a predetermined period of time.

20. The computer-usable medium of claim 14 wherein said computer-readable program code embodied therein causes a computer performing step e) to further perform the step of:

prompting review of said electronic copy of said article for grammatical content.

21. The computer-usable medium of claim 14 wherein said computer-readable program code embodied therein causes a computer performing step e) to further perform the step of:

prompting review of said electronic copy of said article for stylistic characteristics.

22. The computer-usable medium of claim 14 wherein said computer-readable program code embodied therein causes a computer performing step e) to further perform the step of:

prompting review of said electronic copy of said article for validity of hypertext links disclosed therein.

23. The computer-usable medium of claim 14 wherein said computer-readable program code embodied therein causes a computer performing step e) to further perform the step of:

forwarding a summary of said electronic copy of said article to a content creator thereof after said electronic copy of article has been reviewed at said article review site.

24. A computer-implemented method for automated submission of an article into an electronic document system, said method comprising the computer-implemented steps of:

a) receiving, in response to a web-based query form, a location of an electronic copy of an article desired to be submitted into an electronic document system, said electronic copy of said article accessible to said electronic document system;

b) forwarding said received electronic copy of said article to a universal resource locator corresponding to an article review site;

c) organizing said electronic copy of said article in a dual format, both portions of said dual format concurrently displayable on a single common display at said review site such that electronic document system-based program code representing the display appearance of said electronic copy of said article is displayed on said single common display at said article review site;

d) displaying said electronic copy of said article corresponding to said electronic document system-based program code such that the result of alterations to said electronic document system-based program code on said display appearance of said electronic copy of said article is readily observable;

e) prompting review of said electronic copy of said article; and f) entering said electronic copy of said article into said electronic document system after said electronic copy of said article has been reviewed at said article review site.

25. The computer implemented method of claim 24 wherein step b) further comprises the computer implemented steps of:

b1) forwarding said electronic copy of said article to a hold directory at said article review site.

26. The computer implemented method of claim 25 wherein step e) further comprises the computer implemented step of:

e1) notifying an article reviewer if said electronic copy of said article has not been reviewed for grammatical content after a predetermined period of time.

27. The computer implemented method of claim 25 wherein step e) further comprises the computer implemented step of:

e1) notifying an article reviewer if said electronic copy of said article has not been reviewed for technical content after a predetermined period of time.

\* \* \* \* \*